(12) United States Patent
Speckbacher et al.

(10) Patent No.: US 10,119,802 B2
(45) Date of Patent: Nov. 6, 2018

(54) OPTICAL POSITION-MEASURING DEVICE HAVING GRATING FIELDS WITH DIFFERENT STEP HEIGHTS

(71) Applicant: DR. JOHANNES HEIDENHAIN GmbH, Traunreut (DE)

(72) Inventors: Peter Speckbacher, Kirchweidach (DE); Tobias Gruendl, Hausham (DE); Christian Baeuml, Traunwalchen (DE); Josef Weidmann, Feichten a.d. Alz (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 0 days.

(21) Appl. No.: 15/410,806

(22) Filed: Jan. 20, 2017

(65) Prior Publication Data
US 2017/0211923 A1    Jul. 27, 2017

(30) Foreign Application Priority Data

Jan. 21, 2016    (DE) .................. 10 2016 200 847

(51) Int. Cl.
*G01B 9/02*    (2006.01)
*G01D 5/38*    (2006.01)

(52) U.S. Cl.
CPC ..... *G01B 9/02034* (2013.01); *G01B 9/02017* (2013.01); *G01D 5/38* (2013.01); *G01B 2290/30* (2013.01); *G01B 2290/65* (2013.01)

(58) Field of Classification Search
CPC ............ G01B 9/02034; G01B 9/02017; G01B 2290/65; G01B 2290/30; G01D 5/38
See application file for complete search history.

(56) References Cited

U.S. PATENT DOCUMENTS

| 5,430,546 | A | * | 7/1995 | Huber | ...................... G01D 5/38 250/237 G |
| 5,786,931 | A | * | 7/1998 | Speckbacher | ........ G02B 5/1857 359/566 |

(Continued)

FOREIGN PATENT DOCUMENTS

| DE | 102013220190 A1 | 4/2015 |
| DE | 102014218623 A1 | 4/2015 |

(Continued)

OTHER PUBLICATIONS

Glytsis E N et al: "High-Spatial-Frequency Binary and Multilevel Stairstep Gratings: Polarization-Selective Mirrors and Broadband Antireflection Surfaces", Applied Optics, Optical Society of America, Washington, DC; US, vol. 31, No. 22, Aug. 1, 1992 (Aug. 1, 1992), pp. 4459-4470, XP000292091.

*Primary Examiner* — Hwa Lee
(74) *Attorney, Agent, or Firm* — Leydig, Voit & Mayer, Ltd.

(57) ABSTRACT

An optical position-measuring device includes a scale and a scanning reticle, whose relative position is determinable in three linearly independent spatial directions using interfering light beams. A splitter grating is disposed on the scanning reticle and adapted to split light into sub-beams of different diffraction orders. An optical grating is disposed on the scale and adapted to further split the sub-beams and to recombine them after they have been reflected back from the scanning reticle. Grating fields configured as phase gratings are disposed on a side of the scanning reticle that faces the scale. The grating fields act as diffractive optics that influence the further split sub-beams. The grating fields have different step heights. An output grating is disposed on the scanning reticle and adapted to output, as interfering sub- (Continued)

beams, light that has been multiply reflected between the scale and the scanning reticle.

9 Claims, 2 Drawing Sheets

(56) References Cited

U.S. PATENT DOCUMENTS

2015/0098090 A1    4/2015   Holzapfel et al.
2015/0098094 A1    4/2015   Weidmann et al.

FOREIGN PATENT DOCUMENTS

EP         0446691 A2    9/1991
EP         0660139 A1    6/1995

* cited by examiner

OPTICAL POSITION-MEASURING DEVICE HAVING GRATING FIELDS WITH DIFFERENT STEP HEIGHTS

CROSS-REFERENCE TO PRIOR APPLICATION

Priority is claimed to German Patent Application No. DE 10 2016 200 847.1, filed on Jan. 21, 2016, the entire disclosure of which is hereby incorporated by reference herein.

FIELD

The present invention relates to an optical position-measuring device having a scale and a scanning reticle, whose relative position is determinable in three linearly independent spatial directions using a plurality of interfering light beams.

BACKGROUND

A position-measuring device of the aforementioned type is known from the Applicant's German patent application DE 102014218623 A1. Position-measuring devices of this type have the particular advantage that the relative position of two objects can be measured in three spatial directions by a single position-measuring device. Two of these spatial directions are linearly independent of each other (e.g., because they are perpendicular to one another) and parallel to the flat scale and also parallel to the flat scanning reticle. The third spatial direction is perpendicular to the first two directions and corresponds to the distance or a change in distance between the scanning reticle and the scale.

In this known prior art position-measuring device, a splitter grating on the scanning reticle is used to split an incident light beam into a plurality of sub-beams. These sub-beams interact with an optical grating on the scale before they are reflected back to the scanning reticle. There, the light interacts with a plurality of grating fields and mirrors before it returns to the scale, from where it is directed to an output grating on the scanning reticle. The light emitted from the output grating is converted by a plurality of detectors into periodic signals, from which changes in position can ultimately be determined in three spatial directions.

The principle of operation of this position-measuring device and the function of the various grating fields are described in detail in the aforementioned German patent application DE 102014218623 A1. The grating fields act as diffractive optics and may act, for example, as cylindrical lenses. In this connection, it is particularly important that the light be influenced by the individual grating fields in a well-defined manner (in terms of diffraction direction, diffraction efficiency, polarization, phase relationship) so as to ultimately obtain good signals for position measurement in all spatial directions. Until now, this has been accomplished by optimizing the grating fields of the scanning reticle in terms of grating line direction, grating period and line-to-space ratio. These parameters can be readily established, for example, during the manufacture of a mask for a photolithography process. However, it has been found that the accuracy required in the manufacture of such gratings can only be achieved at great cost. The various angles at which the light beams are incident on and deflected by the scanning reticle lead to very different conditions, which are difficult to handle in this way, especially when a single light wavelength is to be used.

A scale having a cross grating and suitable for implementing the present invention is described, for example, in DE 102013220190 A1.

SUMMARY

In an embodiment, the present invention provides an optical position-measuring device which includes a scale and a scanning reticle, whose relative position is determinable in three linearly independent spatial directions using a plurality of interfering light beams, two of the spatial directions being parallel to a plane of the scale and parallel to a plane of the scanning reticle, and the other one of the spatial directions having a component being perpendicular thereto. A splitter grating is disposed on the scanning reticle and adapted to split light into a plurality of sub-beams of different diffraction orders. An optical grating is disposed on the scale and adapted to further split the sub-beams and to recombine the further split sub-beams after the further split sub-beams have been reflected back from the scanning reticle. A plurality of grating fields configured as phase gratings are disposed on a side of the scanning reticle that faces the scale. The grating fields act as diffractive optics that influence the further split sub-beams. The grating fields have different step heights. An output grating is disposed on the scanning reticle and adapted to output, as interfering sub-beams, light that has been multiply reflected between the scale and the scanning reticle.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention improves the scanning reticles of the position-measuring devices known from the prior art and enlarges the process window in the manufacture thereof.

According to an embodiment, an optical position-measuring device includes a scale and a scanning reticle, whose relative position is determinable in three linearly independent spatial directions using a plurality of interfering light beams, two spatial directions being parallel to the plane of the scale and parallel to the plane of the scanning reticle, and the third spatial direction being perpendicular thereto. The position-measuring device has a splitter grating disposed on the scanning reticle and adapted to split light into a plurality of sub-beams of different diffraction orders, as well as an optical grating disposed on the scale and adapted to further split the sub-beams and to recombine these further split sub-beams after they have been reflected back from the scanning reticle. The position-measuring device further has a plurality of grating fields on the side of the scanning reticle that faces the scale, the grating fields acting as diffractive optics for influencing the sub-beams further split at the scale, as well as an output grating disposed on the scanning reticle and adapted to output, as interfering sub-beams, light that has been multiply reflected between the scale and the scanning reticle. It is a feature of the position-measuring device that a step height of the plurality of grating fields configured as phase gratings is variable.

By providing different step heights for the grating fields receiving light from different directions, an additional degree of freedom is obtained in the design of the grating fields, and thus in establishing the diffraction efficiencies for the individual gratings. Even if the manufacturing process becomes slightly more complex due to such different step heights, for example, because different etch depths are required for different grating fields, all in all, a larger process window is nevertheless obtained, and thus a higher yield in the manufacture of the scanning reticles. Despite the increased complexity in the etching of the gratings, the production of these highly sophisticated optical components of the position-measuring device is made more cost-effective in this way. A position-measuring device of this kind can be operated using a single light wavelength, and thus with a single light source.

Figure 1:
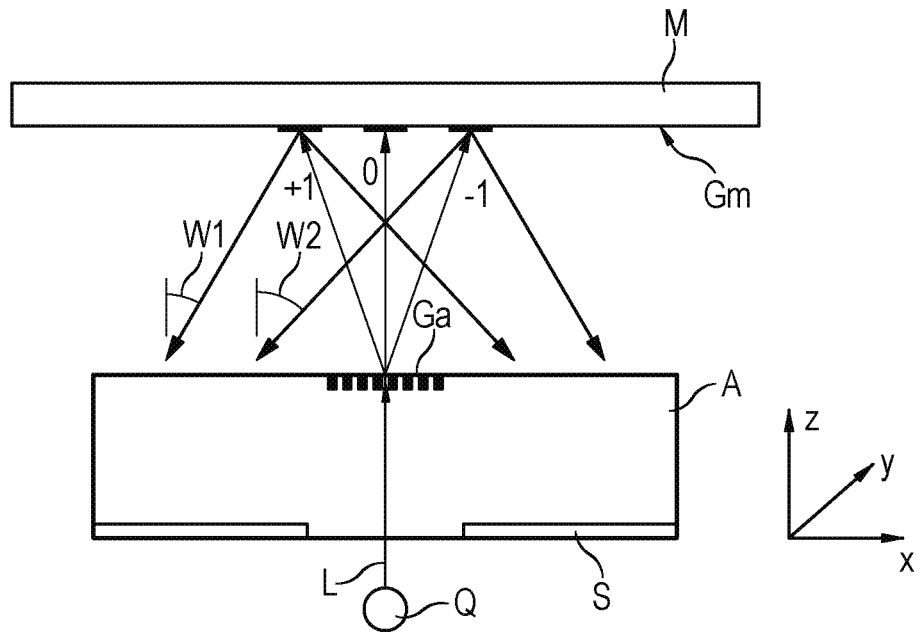
FIG. 1 is a schematic side view showing a scanning reticle and a scale of a position-measuring device.
Figure 2:
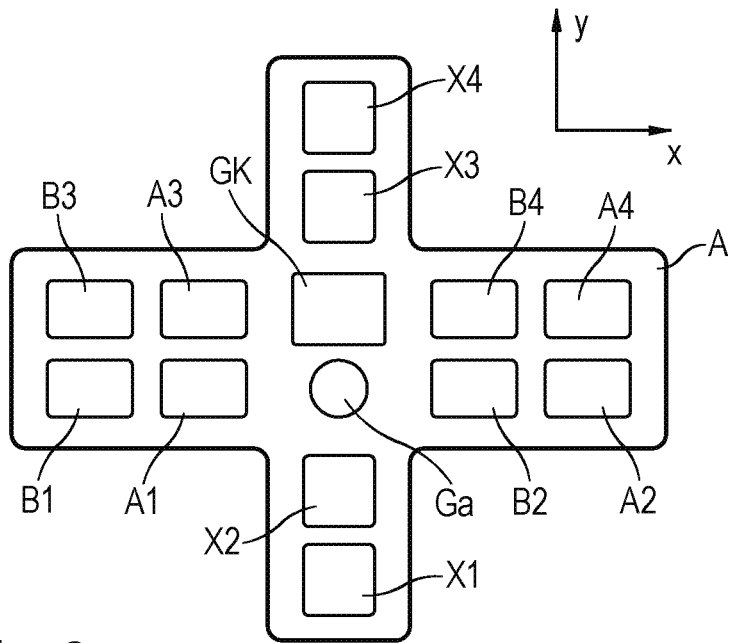
FIG. 2 is a plan view of the side of the scanning reticle of FIG. 1 that faces the scale.

FIG. 1 schematically illustrates the basic design of a position-measuring device of the above-mentioned type having a flat scanning reticle A extending in two spatial directions X and Y and a flat scale M parallel to scanning reticle A. FIG. 2 shows in plan view the side of scanning reticle A that faces scale M.

Light L of a light source Q passes in the Z-direction through transparent scanning reticle A and strikes a splitter grating Ga provided on the side of scanning reticle A that faces scale M. This splitter grating Ga splits light L into a plurality of sub-beams +1, 0, −1 of different diffraction orders. These three sub-beams +1, 0, −1 strike an optical grating Gm provided on the side of scale M that faces scanning reticle A. This optical grating is a cross grating which, in turn, splits sub-beams +1, 0, −1 into different diffraction orders, preferably each one into a $+1^{st}$ and a $-1^{st}$ diffraction order, while suppressing the $0^{th}$ diffraction order. This results in a total of six (3 times 2) light beams propagating back to scanning reticle A. While the sub-beams +1, 0, −1 having interacted with splitter grating Ga are dispersed only in the X-Z plane, there are also light beams having a component in the Y direction after interaction with optical grating Gm of scale M because cross grating Gm of scale M produces diffraction in both the X and Y directions.

The total of six light beams then propagate from scale M back to scanning reticle A, where they strike six different grating fields B1, B2, A1, A2, X1, X3. The different angles of incidence w1, w2 occurring in the process are readily discernible in FIG. 1. These grating fields act as diffractive optics, which direct and focus the light onto mirrors S applied to the side of scanning reticle A that faces away from scale M. Such mirrors may be implemented as a vapor-deposited layer of chromium, aluminum, silver or gold.

These mirrors S reflect the light to six further grating fields B3, B4, A3, A4, X2, X4 which, in turn, direct and focus the light such that it propagates back to scale M. There, optical grating Gm combines the light into one beam which propagates back to scanning reticle A, where it strikes an output grating Gk, from where interfering sub-beams propagate to photodetectors. The photodetectors emit periodic signals in response to a change in position. Based on these periodic signals, it is possible to derive changes in position in all three spatial directions X, Y and Z.

As for the principle of operation of this position-measuring device, reference is once again explicitly made to the German patent application DE 102014218623 A1 mentioned at the outset, in which the position-measuring device schematically illustrated here is described in detail.

Looking at the geometry of scanning reticle A and, in particular, the spatial arrangement of grating fields A1, A2, A3, A4, B1, B2, B3, B4, X1, X2, X3, X4 on scanning reticle A, as well as the paths traveled by the total of six light beams from scale M to scanning reticle A and back, it becomes clear that light may strike scanning reticle A at a variety of different angles w1, w2, phase relationships and polarizations (s, p, circular, elliptical). In order to achieve an optimal influence on the light, it is proposed to optimize the grating fields A1, A2, A3, A4, B1, B2, B3, B4, X1, X2, X3, X4 of scanning reticle A also with respect to their etch depth.

In this regard, one has to be aware that the conventional method of manufacturing such grating fields is to produce an etching mask with grating patterns that are transferred into scanning reticle A using an etching process. The etching mask may define the direction of the grating lines, the grating period and the scanning ratio (i.e., the ratio of the grating line width to the grating period), but not the etch depth. The etch depth is determined by an etching process which is the same for all gratings. Thus, in order to produce grating fields A1, A2, A3, A4, B1, B2, B3, B4, X1, X2, X3, X4 with steps of variable height, a plurality of different etching processes are necessary, each of which acts on a different etching mask. This makes the manufacture of scanning reticle A more complex due to the additional lithography steps required, but provides advantages with respect to measurement signal optimization and also with respect to the yield in the manufacture of scanning reticle A.

It should be noted at this point that the effect of the gratings discussed here is based on a phase difference which occurs when light travels a longer path (ridge of the grating) and a shorter path (space of the grating) through an optically dense medium. As will be described in greater detail in the exemplary embodiments to follow, the term "step height" of such a phase grating is not limited to the mere size of an etched step, but rather the refractive index of the respective layers must also be taken into account.

The following describes, with reference to three exemplary embodiments, how steps of variable height may be formed in grating fields A1, A2, A3, A4, B1, B2, B3, B4, X1, X2, X3, X4.

Figure 3:
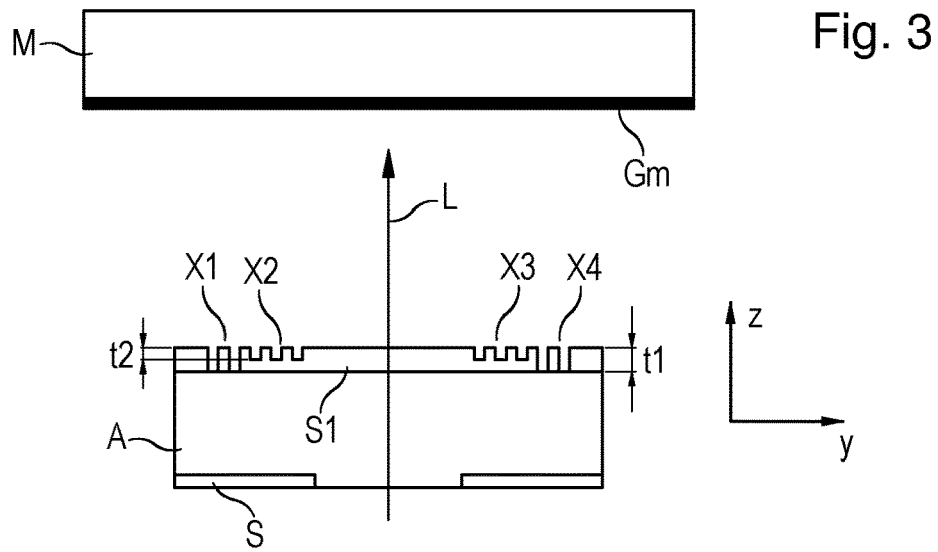
FIG. 3 is a view of a scanning reticle having grating fields of variable step height in accordance with a first exemplary embodiment.

FIG. 3 shows, in cross section, a scanning reticle A with grating fields X1, X2, X3, X4, as well as a scale M with optical grating Gm. Scanning reticle A is composed of a glass-ceramic having a thermal expansion coefficient of nearly zero (available, for example, under the trade name Zerodur; alternatively, a quartz block, for example, could also be used), as well as a layer S1 of silicon dioxide ($SiO_2$) deposited thereon. Tantalum pentoxide and silicon are examples of alternative materials that could also be used for layer S1. Layer S1 has grating fields X1, X2, X3, X4 having variable step heights t1, t2 etched therein. Step height t1 is used for gratings X1 and X4, while step height t2 is used for grating fields X2 and X3.

Figure 4:
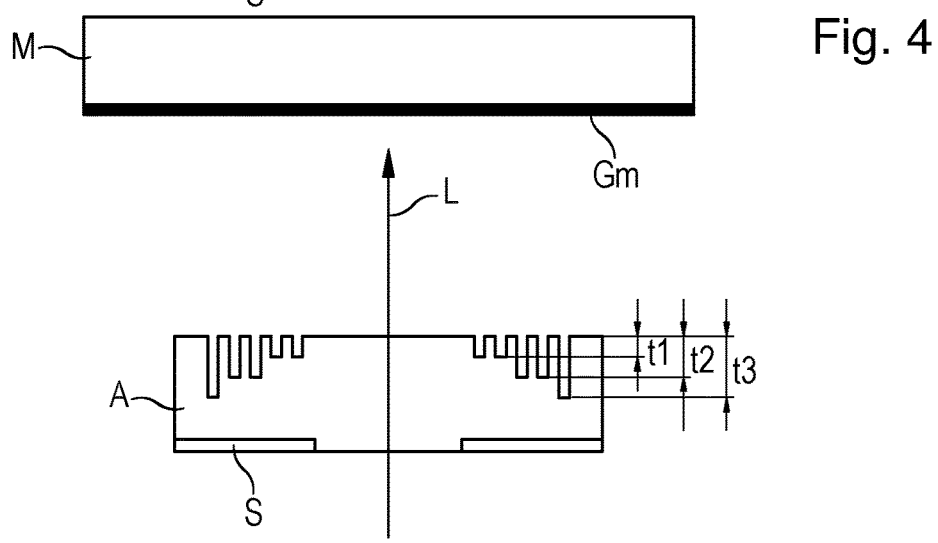
FIG. 4 is a view of a scanning reticle having grating fields of variable step height in accordance with a second exemplary embodiment.
Figure 5:
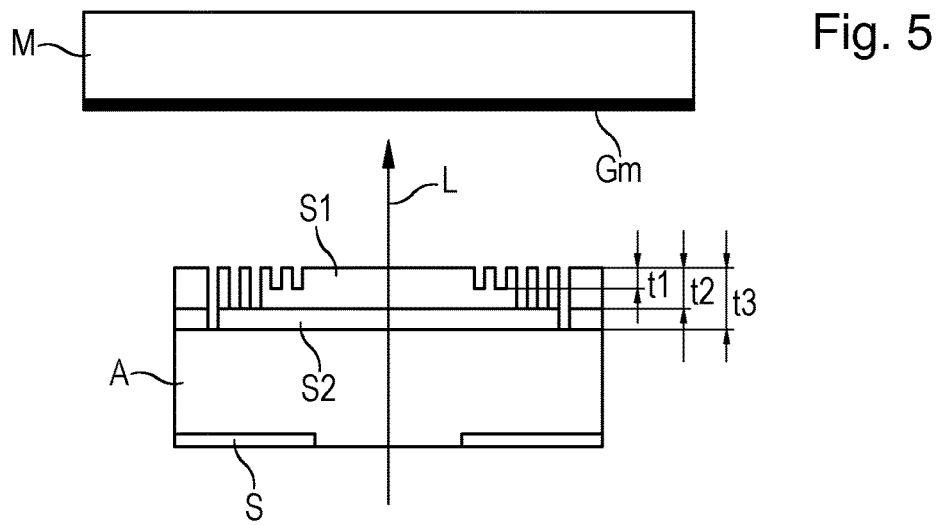
FIG. 5 is a view of a scanning reticle having grating fields of variable step height in accordance with a third exemplary embodiment.

Step heights t1, t2 (and thus the grating fields having the same step height) are arranged symmetrically with respect to the center of scanning reticle A. This center is located approximately centrally between splitter grating Ga and output grating Gk. In FIGS. 3-5, this center is indicated by incident light L. This symmetry reduces the sensitivity of the position-measuring device to slight tilting of scanning reticle A relative to scale M. Typical step height values could, for example, be t1=1600 nm and t2=950 nm when scanning is performed using light having a wavelength of 976 nm. For other wavelengths, other step heights t1, t2 would be optimal.

FIG. 4 shows a scanning reticle A where the grating fields are etched directly into a quartz glass substrate (available, for example, under the trade name HERASIL or SUPRASIL). To illustrate the possibilities, three different step heights t1, t2 and t3 are implemented here, since the present invention is not limited to only two different step heights. In order to reduce sensitivity to tilting, the different step heights t1, t2, t3 are again arranged symmetrically with respect to the center of scanning reticle A.

As another exemplary embodiment, FIG. 5 shows a scanning reticle A where an additional silicon layer S2 is disposed between a Zerodur substrate and a silicon dioxide layer S1. This can be useful especially when large phase differences have to be produced, and accordingly, particularly large step heights. Looking at the steps having the step height t3, it can be seen that these steps partially extend into layer S2. This silicon layer S2 has a markedly higher refractive index than $SiO_2$ layer S1. Thus, the optically effective step height is significantly larger since the phase-shifting effect of each step depends on the average refractive index of the through-etched layer. The etching effort is reduced due to the additional layer S2 since, compared to a pure $SiO_2$ layer S1, a smaller etch depth is needed to obtain a predetermined phase shift at the grating.

In other words: The optical field passing through scanning reticle A always sees the so-called optical layer thickness:

$$d_{opt} = n \cdot d,$$

where d is the physical layer thickness (which may, for example, be determined tactilely) and n is the (average) refractive index of the etched layers. Thus, the term "step height" primarily provides an indication of the magnitude of the phase difference.

Thus, in principle, one may also conceive of scanning reticles A having a sequence of different layers S1, S2 on a transparent substrate, with grating fields having variable (different) step heights being etched into this sequence of layers.

While a preferred embodiment of the position-measuring device uses a monochromatic light source Q (e.g., a laser source) emitting light of a single wavelength, which was actually an objective and one of the starting points of the present invention, the invention is not limited thereto. Even when multiple wavelengths are to be used to enable the different position measurements in spatial directions X, Y, Z, a scanning reticle A can also be better adapted for this purpose than conventional scanning reticles A having grating fields A1, A2, A3, A4, B1, B2, B3, B4, X1, X2, X3, X4 of a single step height.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An optical position-measuring device, comprising:
    a scale and a scanning reticle, whose relative position is determinable in three linearly independent spatial directions using a plurality of interfering light beams, two of the spatial directions being parallel to a plane of the scale and parallel to a plane of the scanning reticle, and the other one of the spatial directions having a component being perpendicular thereto;
    a splitter grating disposed on the scanning reticle and adapted to split light into a plurality of sub-beams of different diffraction orders;
    an optical grating disposed on the scale and adapted to further split the sub-beams and to recombine the further split sub-beams after the further split sub-beams have been reflected back from the scanning reticle;
    a plurality of grating fields configured as phase gratings disposed on a side of the scanning reticle that faces the scale, the grating fields acting as diffractive optics that influence the further split sub-beams, each of the grating fields comprising a plurality of graduation periods and a same step height, the step heights of the grating fields being different from each other; and
    an output grating disposed on the scanning reticle and adapted to output, as interfering sub-beams, light that has been multiply reflected between the scale and the scanning reticle.

2. The device as recited in claim 1, wherein grating fields having the same step height are arranged in pairs symmetrically with respect to a center of the scanning reticle.

3. The device as recited in claim 2, wherein the center of the scanning reticle is located between the splitter grating and the output grating.

4. The device as recited in claim 1, wherein the scanning reticle includes a glass-ceramic having a thermal expansion coefficient of nearly zero, on which is disposed a layer in which the grating fields are formed by etching.

5. The device as recited in claim 4, wherein the layer is a silicon dioxide layer.

6. The device as recited in claim 1, wherein the scanning reticle includes a quartz glass substrate in which the grating fields are formed by etching.

7. The device as recited in claim 1, wherein the scanning reticle includes a glass-ceramic having a thermal expansion coefficient of nearly zero, on which is disposed a layer stack including layers having different refractive indices, and wherein the grating fields are formed in the layer stack by etching.

8. The device as recited in claim 7, wherein the layer stack includes layers of silicon dioxide and silicon.

9. The device as recited in claim 1, further comprising a monochromatic light source configured to generate the light.

* * * * *